(12) United States Patent
High et al.

(10) Patent No.: US 10,515,555 B2
(45) Date of Patent: Dec. 24, 2019

(54) SYSTEM AND METHOD FOR MANAGING A SWARM OF UNMANNED AERIAL VEHICLES

(71) Applicant: Walmart Apollo, LLC, Bentonville, AR (US)

(72) Inventors: Donald R. High, Noel, MO (US); David Winkle, Bentonville, AR (US); John J. O'Brien, Farmington, AR (US); Robert Cantrell, Herndon, VA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/264,190

(22) Filed: Jan. 31, 2019

(65) Prior Publication Data

US 2019/0236963 A1   Aug. 1, 2019

Related U.S. Application Data

(60) Provisional application No. 62/624,751, filed on Jan. 31, 2018.

(51) Int. Cl.
*G08G 5/00* (2006.01)
*G05D 1/00* (2006.01)
*B64C 39/02* (2006.01)

(52) U.S. Cl.
CPC ......... *G08G 5/0021* (2013.01); *B64C 39/024* (2013.01); *G05D 1/0027* (2013.01);
(Continued)

(58) Field of Classification Search
CPC .. G08G 5/0021; G08G 5/0008; G08G 5/0013; B64C 39/024; B64C 2201/128; B64C 2201/146; G05D 1/0027
(Continued)

(56) References Cited

U.S. PATENT DOCUMENTS 9,102,406 B2   8/2015   Stark et al.
9,415,869 B1   8/2016   Chan et al.
(Continued)

FOREIGN PATENT DOCUMENTS

CN         106802665 A      6/2017
WO       2018004681 A1      1/2018
WO   WO-2018005663 A1 *    1/2018   ........... B64C 39/024

OTHER PUBLICATIONS

Bian et al., "A secure communication framework for large-scale unmanned aircraft systems", IEEE 2013, pp. 1-12.
(Continued)

*Primary Examiner* — Tuan C To
(74) *Attorney, Agent, or Firm* — Venable LLP; Jeffri A. Kaminski

(57) ABSTRACT

Systems and methods for managing communication of a plurality of unmanned aerial vehicles. The present invention can include a central server and a plurality of unmanned aerial vehicles including a master and secondary unmanned aerial vehicle. The master and secondary unmanned aerial vehicles can communicate with the central server and each other. The master and secondary unmanned aerial vehicle can deliver packages to different locations. In doing so, the master and secondary unmanned aerial vehicle can form a swarm that at least partially share a route for delivery of the packages to their destinations. The master unmanned aerial vehicle can be configured to: (i) receive delivery information for the master and secondary unmanned aerial vehicles, (ii) monitor communication between the swarm, and (iii) determine if the swarms encounters a risk.

19 Claims, 6 Drawing Sheets

(52) U.S. Cl.
CPC ......... *G08G 5/0008* (2013.01); *G08G 5/0013* (2013.01); *B64C 2201/128* (2013.01); *B64C 2201/146* (2013.01)

(58) Field of Classification Search
USPC .......................................................... 701/2
See application file for complete search history.

(56) References Cited

U.S. PATENT DOCUMENTS

| | | |
|---|---|---|
| 9,524,648 B1 | 12/2016 | Gopalakrishnan et al. |
| 9,651,945 B1 | 5/2017 | Erickson et al. |
| 9,760,072 B2 | 9/2017 | Hall et al. |
| 9,847,032 B2 | 12/2017 | Postrel |
| 2014/0032034 A1* | 1/2014 | Raptopoulos ........ G08G 5/0069 701/25 |
| 2014/0249693 A1 | 9/2014 | Stark et al. |
| 2016/0257423 A1* | 9/2016 | Martin ..................... B64F 1/00 |
| 2016/0293018 A1 | 10/2016 | Kim et al. |
| 2016/0378108 A1 | 12/2016 | Paczan et al. |
| 2017/0137128 A1* | 5/2017 | Natarajan ............. B64C 39/024 |
| 2017/0213062 A1* | 7/2017 | Jones .................... G06K 7/1417 |
| 2017/0286892 A1* | 10/2017 | Studnicka ............ G06Q 10/083 |
| 2017/0295609 A1* | 10/2017 | Darrow ................. H04W 84/18 |
| 2017/0355076 A1* | 12/2017 | Gordon-Carroll .... A47L 9/2852 |
| 2018/0137454 A1* | 5/2018 | Kulkarni ............... B64C 39/024 |
| 2018/0142992 A1* | 5/2018 | High ....................... G09F 27/005 |
| 2019/0012631 A1* | 1/2019 | Chatani ................ G06Q 10/083 |
| 2019/0019141 A1* | 1/2019 | Torii ...................... B64C 39/024 |
| 2019/0043370 A1* | 2/2019 | Mulhall ................. G08G 5/0069 |
| 2019/0199534 A1* | 6/2019 | Beaman ................ H04L 9/3247 |

OTHER PUBLICATIONS

International Search Report and Written Opinion dated Apr. 2, 2019, issued in corresponding PCT Application No. PCT/US2019/016063.

Sam Clark, "Swarm intelligence key to successful operation of drones, says study", IoT, thestack.com, Aug. 22, 2017, pp. 1-9.

Raja Naeem Akram et al., "Security, Privacy and Safety Evaluation of Dynamic and Static Fleets of Drones", arXiv:1708.05732v1, Aug. 18, 2017, pp. 1-12.

* cited by examiner

SYSTEM AND METHOD FOR MANAGING A SWARM OF UNMANNED AERIAL VEHICLES

PRIORITY

The present application claims priority to U.S. Provisional Patent Application No. 62/624,751, filed Jan. 31, 2018, the contents of which are incorporated herein in their entirety.

BACKGROUND

1. Technical Field

The present disclosure relates to a command and control system for a swarm of unmanned aerial vehicles (UAVs), and more specifically, a system for communication while the swarm of UAVs are in route to one or more destinations.

2. Introduction

Unmanned aerial vehicles (UAVs) have become common for a variety of reasons. As such, UAVs have been routinely deployed in swarms. However, deploying UAVs in swarms can present many problems. For instance, one or more of the UAVs in a swarm can be threatened from an external source. As such, the UAVs in the swarm may face a threat from the external source, and possibly overrun by the external source. Moreover, coordinating between the UAVs, while flying in formation and responding to external events, is a technical problem in this field.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An exemplary system for managing a swarm of unmanned aerial vehicles can include: a central server; and a plurality of unmanned aerial vehicles including a master unmanned aerial vehicle and one or more secondary unmanned aerial vehicles. The master unmanned aerial vehicle can be configured to communicate with the central server and to deliver a first package to a first location. The secondary unmanned aerial vehicle can be configured to communicate with at least one of the central server and the master unmanned aerial vehicle and to deliver a second package to a second location. The master unmanned aerial vehicle and the secondary unmanned aerial vehicle can form a swarm of unmanned aerial vehicles that at least partially share a route for delivery of the first package and the second package to the first location and the second package, respectively. As such, the master unmanned aerial vehicle can be configured to—(i) receive delivery information for the master unmanned aerial vehicle and the secondary unmanned aerial vehicle, (ii) monitor communication between the swarm of unmanned aerial vehicles, and (iii) determine if the swarm of unmanned aerial vehicles encounters a risk.

In another exemplary embodiment of the present invention, a system for managing a swarm of unmanned aerial vehicles can include: a central server; and a plurality of unmanned aerial vehicles in communication with the central server and configured to deliver a plurality of packages to different locations. The unmanned aerial vehicles can form a swarm of unmanned aerial vehicles that at least partially share a route for delivery of the plurality of packages. As such, the swarm of unmanned aerial vehicles can include a first unmanned aerial vehicle and a second unmanned aerial vehicle. The first unmanned aerial vehicle can be configured to—(i) act as a communication shield to block one or more potential threats to the swarm of unmanned aerial vehicles for a first period of time during the route of the swarm of unmanned aerial vehicles, and (ii) determine if the swarm of unmanned aerial vehicles encounters a risk during first period of time during the route of the swarm of unmanned aerial vehicles. The second unmanned aerial vehicle can be configured to—(i) act as the communication shield for a second period of time during the route of the swarm of unmanned aerial vehicles, and (ii) determine if the swarm of unmanned aerial vehicles encounters a risk during second period of time during the route of the swarm.

An exemplary method for managing a swarm of unmanned aerial vehicles can include: (i) receiving, by a central server, a first delivery destination and a second delivery destination for a first unmanned aerial vehicle and a second unmanned aerial vehicle, respectively, wherein the first delivery destination is different the second delivery destination; (ii) identifying, by the central server, the first unmanned aerial vehicle and the second unmanned aerial vehicle to transport to the first delivery destination and the second delivery destination, respectively; (ii) informing, by the central server, the first unmanned aerial vehicle and the second unmanned aerial vehicle of the first delivery destination and the second delivery destination, respectively; (iv) informing, by the central server, the first unmanned aerial vehicle and the second unmanned aerial vehicle to form a swarm in route to the first delivery destination and the second delivery destination; and (v) identifying, by the central server, one of the first unmanned aerial vehicle and the second unmanned aerial vehicle as a master unmanned aerial vehicle. The master unmanned aerial vehicle can be configured to act as a communication shield to block one or more potential threats to the swarm, and to determine if the swarm encounters a risk, in route to the first delivery destination and the second delivery destination.

DETAILED DESCRIPTION

Figure 1:
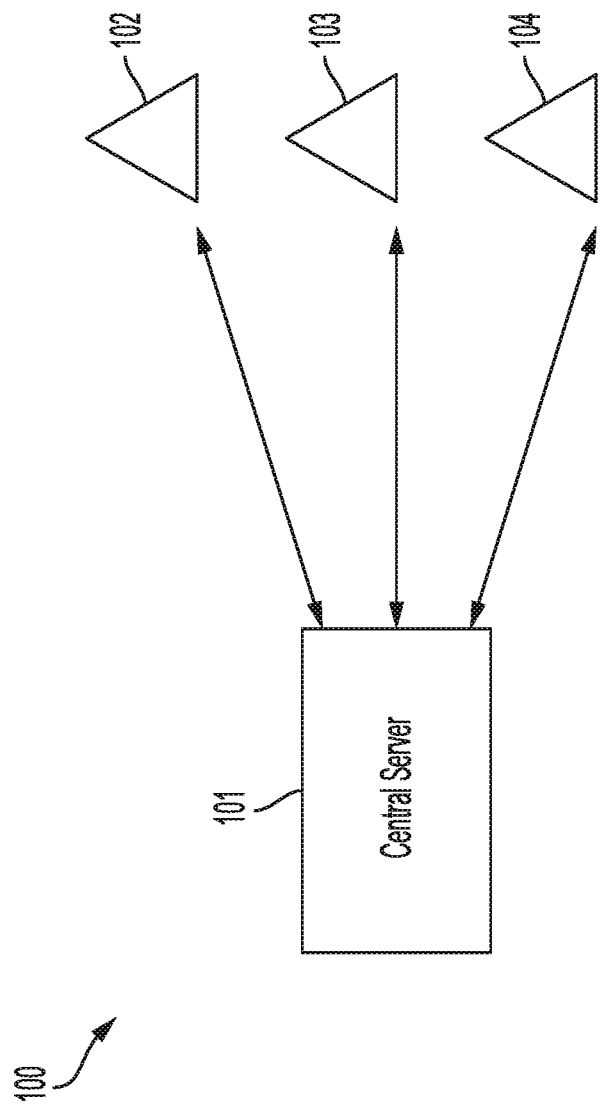
FIG. 1 illustrates an exemplary system for managing a swarm of unmanned aerial vehicles in accordance with embodiments of the invention.

Various embodiments of the disclosure are described in detail below. While specific implementations are described, it should be understood that this is done for illustration purposes only. Other components and configurations may be used without parting from the spirit and scope of the disclosure. It is also important to note that any reference in the specification to "one embodiment," "an embodiment" or "an alternative embodiment" means that a particular feature, structure or characteristic described in connection with the embodiment is included in at least one embodiment of the invention. As such, the recitation of "in one embodiment" and the like throughout the specification does not necessarily refer to the same embodiment The systems and methods disclosed herein are directed to managing communication of a swarm of UAVs delivering packages to various destinations. Referring now to the figures, various embodiments of systems and methods for managing communication between UAVs configured to fly in a swarm will be described. Referring now to FIG. 1, an exemplary system 100 for managing communication between UAVs configured to fly in a swarm is illustrated. The system 100 can include a central server 101 and a plurality of UAVs 102-104. The UAVs 102-104 can be configured to operate the features described below autonomously using onboard computers.

The central server 101 can receive package information from one or more distribution centers and/or local stores. Example package information can include one or more of an identification number, a weight of the package, dimensions of the package, and a deliver time of the package. Along these lines, the central server 101 can manage orders for one or more distribution centers and/or local stores. As such, the central server 101 can be located within a specific distribution center or local store. According to an embodiment, the central server 101 can be specific for a distribution center.

Moreover, the central server 101 can be in communication with one or more UAVs 102-104. As such, the central server 101 can select a package for each respective UAV 102-104 to deliver to a destination. This can be based on package information of the package and/or one or more capabilities of the UAV. As discussed above, package information can include one or more of an identification number of the package, a weight of the package, dimensions of the package, and a deliver time of the package. Capabilities of the UAV can include one or more a maximum package size, a maximum package weight, a maximum flying speed, and a maximum flying distance.

Along these lines, the central server 101 can select a plurality of UAVs carrying packages to fly in a swarm while delivering their packages to their respective destination. The UAVs carrying packages to fly in the swarm may be selected based on their destination. As such, UAVs carrying packages to fly in the swarm may be selected if their destinations are located within a defined radius. The defined radius can be a predetermined number of miles from a selected point. The predetermined number can be 5 miles, 10 miles, 25 miles, 50 miles, or 100 miles. The radius can also be determined based on altitude of delivery. For example, if multiple packages are being delivered to the ground floor of a building, those UAVs delivering to the ground floor may be clustered together as a swarm, whereas UAVs delivering packages to the roof of the building may form a separate swarm.

The preselected point can be a delivery destination of one of the UAVs 102-104. For example, the preselected point can be a delivery destination of the master UAV or one of the secondary UAVs. Alternatively, the predefined point can be the distribution center or local store from which the UAV departs or another distribution center or local store to which they will return after delivery.

Upon selecting the UAVs 102-104 to fly in the swarm, the central server 101 can determine whether there will be a master UAV. According to an embodiment, only one of the UAVs 102-104 can be a master UAV. According to another embodiment, two or more of the UAVs 102-104 can concurrently be master UAVs. The remaining UAVs can be considered secondary UAVs. The selection of the master UAV can be based on the capabilities of the UAVs, as mentioned above, and/or the routes of the UAVs. For example, the central server 101 can select the UAV having the furthest destination from a starting point as the master UAV.

Along these lines, the central server 101 can designate one master UAV during the entire route, or can designate multiple UAVs to serve as the master UAV at different times while in the swarm. The central server 101 can designate the master UAV prior to departure, or can instruct that the designation of the master UAV can be made dynamically during the route. As such, the central server 101, and/or the group of UAVs 102-104, can collectively select one of the UAVs 102-104 as the master UAV, and all other UAVs 102-104 as secondary UAVs.

However, if the central server 101 determines that there will not be a master UAV in the swarm, the central server 101 can treat each of UAVs 102-104 equally. In other words, each of the UAVs 102-104 can be considered secondary UAVs. In doing so, the secondary UAVs 102-104 can work together during flight.

After determining if there will be a master UAV, the central server 101 can inform one or more of the UAVs 102-104 of one or more of a delivery destination, a swarm structure, a designated roll in the swarm, and/or a route of the swarm. According to an embodiment, if there is a master UAV, the central server 101 can inform only the master UAV of the delivery destination, the swarm structure, the designated roll in the swarm, and/or the route of the swarm. The master aerial vehicle can then send this information to the secondary UAVs. Alternatively, the central server 101 can send the swarm structure to the master unmanned aerial controller and all secondary UAVs. This can allow all secondary UAVs to each receive their appropriate delivery destination, the swarm structure, their appropriate designated route in the swarm, and/or the appropriate for the swarm in case an external threat, as will be discussed in more detail below.

According to another embodiment, if there not a master UAV, the central server 101 can inform each of the UAVs individually of their delivery destination, the overall swarm structure, the designated roll in the swarm, and/or the route of the swarm. This can allow each of UAVs to receive their appropriate delivery information, their appropriate designated route within the swarm, and the appropriate action for the swarm in a situation in which an external source poses a threat, as will be discussed in more detail below.

In some configurations, the swarm structure can be set by one or more of the UAVs 102-104. As such, the swarm structure can be dynamically updated during route. For example, where there is a master UAV, the master UAV can control the swarm structure and modify the swarm structure based on threats, environmental conditions, conditions of the UAVs in the swarm, instructions from the central server 101, a request from another UAV within the swarm, a request from a UAV which is not in the swarm, etc. In configurations where there is not a master UAV, the UAVs can collectively determine an appropriate swarm structure. Hence, the swarm structure can be dynamically updated based on one or more conditions, including, for example, a geographical location of the swarm, current weather conditions condition, a number of UAVs in the swarm, a request from the central server 101, a characteristic of the UAV (e.g., energy supply), etc.

Figure 2:
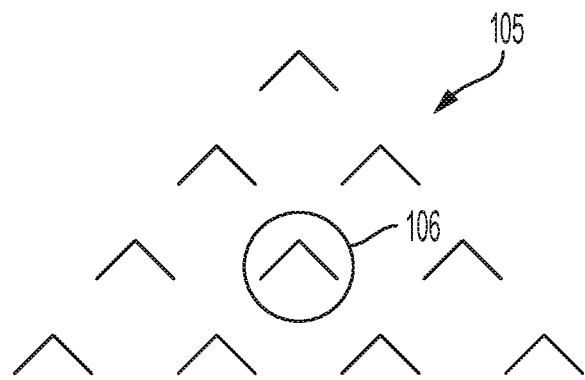
FIGS. 2-4 illustrate exemplary swarms of unmanned aerial vehicles in accordance with embodiments of the invention.
Figure 3:
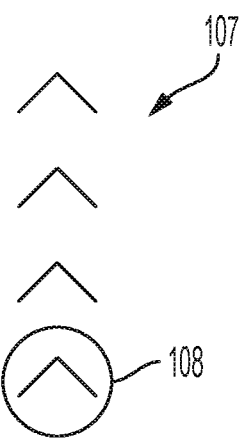
Figure 4:
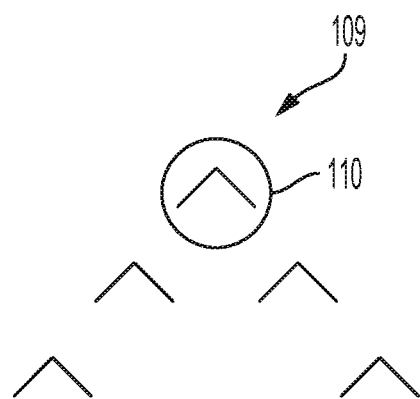
Figure 5:
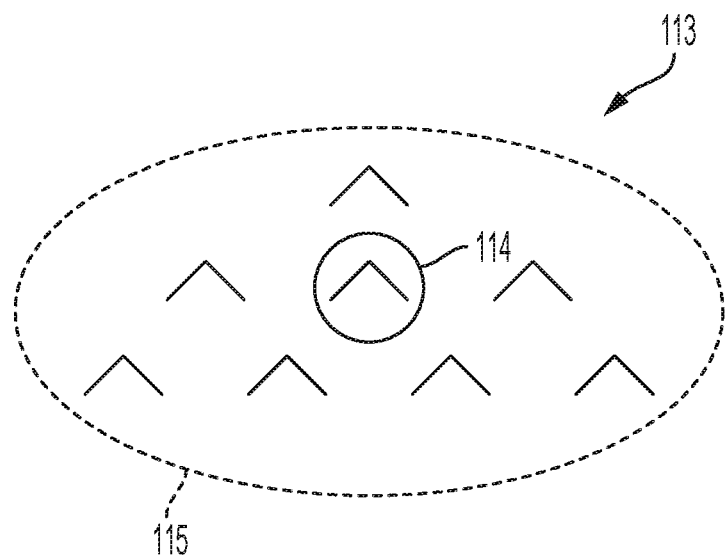
FIGS. 5 and 6 illustrate an exemplary unmanned aerial vehicles forming a communication shield around a swarm of unmanned aerial vehicles in accordance with embodiments of the invention.

As to the swarm structure, it can refer to the shape that the UAVs 102-104 are to take during flight when they are together, with individual UAVs within the swarm being assigned specific locations. The swarm structure can be configured to any shape. Referring now to FIGS. 2-4, exemplary shapes that swarms may take in route is illustrated. FIG. 2 illustrates a swarm 105 take the shape of a triangle. FIG. 3 illustrates a swarm 107 in the shape of a straight line. FIG. 4 illustrates a swarm 109 in the shape of the letter "V." The swarm 107 can also form three-dimensional shapes.

Referring back to FIG. 1, the shape of the swarm may be consistent, or change, throughout the route. As such, the shape of swarm can be based on one or more of conditions discussed above, for example a current weather condition, conservation of energy, and an expected time for delivery. Consequently, the swarm structure may decrease energy consumption, decrease time spent in route, and/or increase traveling speed for one or more UAVs within the swarm. Moreover, the swarm structure can provide an easier way to communicate between the UAVs 102-104 and to the central system 101.

Along these lines, the position of a single UAV in the swarm may be consistent, or change, through the route. According to an embodiment, where there is a master UAV, it may be located at any place in the swarm. Referring now to FIGS. 2-4 illustrate exemplary locations UAVs may be in swarms of different shapes is illustrated. FIG. 2 illustrates a master UAV 106 in the middle of the swarm 105 shaped as a triangle. FIG. 3 illustrates a master UAV 108 at the end of the swarm 107 shaped as a straight line. FIG. 4 illustrates a master UAV 110 can be placed in the middle and front of the swarm 109 shaped as the letter "V." According to another embodiment, where is not a master UAV, the UAVs can be placed at a location in the swarm as illustrated above with respect to the master UAV.

As such, referring back to FIG. 2, the position of the UAVs, including one deemed the master UAV, in the swarm 102 can be based on one or more properties of a particular UAV. The properties of the UAV can include, for example, communication requirements (discussed in more detail below), energy consumption of the UAV, fly time of the UAV, and/or required maintenance of the UAV. Accordingly, each UAV can be assigned a position based on one or more of power consumption and/or communication requirements. For example, depending on the shape and structure of the swarm 102, the front of the swarm 102 may consume most energy, the middle of the swarm 102 may serve as the best location to provide a communication shield, and the back tail of the swarm 102 may provide the strongest path of communication to the other UAVs and/or central server. Accordingly, the UAVs can switch positions to conserve energy, permit a sufficiently strong communication shield, and/or provide a sufficiently strong path of communication to the other UAVs and/or to the central server.

Moreover, each UAV can each utilize their imaging source to identify a proper place in the swarm and/or current geographical information of other UAVs. In doing so, each UAV can utilize their imaging source to confirm that other UAVs are on an appropriate route. According to an embodiment, the imaging source can be a camera. As such, the UAVs can utilize their cameras to verify tail numbers of other UAVs, to confirm that they are on the appropriate route, and/or to confirm a location within the swarm. If the UAVs determine that the swarm is deviating from the appropriate rotate, an individual UAV or a cluster of UAVs can break away from the main swarm and head to respective delivery destinations. This can permit the UAVs to not follow the swarm if one or more of the UAVs have been compromised.

Referring back to FIG. 1, while in route in the swarm, the UAVs 102-104 can each be assigned a role. Exemplary roles can include sensing one or more weather conditions during route, acting as a communication shield (which will be discussed in more detail below), communicating with the central server, and/or monitoring the route of the swarm. In some configurations, an individual UAV may have more than one role. Along these same lines, each of the UAVs 102-104 may have the same and/or different roles. For instance, each UAV 102-104 can be configured to validate one or more of a path, a route, and/or a location per network assignment. By doing so, each UAV can determine if the swarm is off route and fly to their own destination.

As such, the assigned role of each of the UAVs 102-104 can be based on moving the entire swarm forward on a collective mission (e.g., a route). The role assigned to each of the UAVs 102-104 can be based on one or more characteristics of a particular UAV. The characteristics of the particular UAV can include a payload, a delivery location, a distance in the swarm, a distance without the swarm, and an expected power consumption. Along these lines, the characteristics of the particular UAV can be unique to each of the UAVs 102-104. As such, the characteristics for one of the UAVs 102-104 may be different than for another one of the UAVs 102-104. For example, the power consumption for individual UAVs may serve as a main point of communication between other UAVs and/or the central server 101, and that power consumption can vary from UAV to UAV. Likewise, the communications may vary based on the role(s) of a UAV. An individual drone may be assigned one or more of the following exemplary roles:

Master drone
Communications drone
Geo-location drone
Scout drone
Lead drone

Further, the UAVs 102-104 can communicate using multiple transmission paths, while in the swarm. Specifically, for example, the UAVs can communicate between themselves (i.e., the UAVs within the swarm) via a first communication path (e.g., Bluetooth), and can communicate to the central server using a second communication path (e.g., satellite communications). The first communicate path and the second communication path can be different from each other. As such, the first and second communication paths can be configured to transmit on different wavelengths, require different bandwidths, use different modulation schemes, and/or draw different amounts of power. For example, along these lines, the first communication path can be configured to transmit short distances, and the second communication path can be configured to transmit long distances. Exemplary communication paths can include Bluetooth, nearfield communications, Radio (aka RF communications, Satellite communications, infrared, or any other communication system for communicating between two moving automated vehicles.

Moreover, while in the swarm, one or more of the UAVs 102-104 can act as a communication shield for the swarm. The communication shield can serve as a firewall and block any unauthorized communication to any of the UAVs 102-104. The UAVs 102 serving as the communication shield can be based on any of properties of the UAV discussed above. This can permit the UAVs 102-104 to not be interfered with an unauthorized external source, and to more safely communicate on the first communication path described above. According to an embodiment, where there is a master UAV, it can provide the communication shield to the swarm by itself or with another master UAV or a secondary UAV. Alternatively, the master UAV can designate one or more the secondary UAVs to serve as the communication shield. According to yet another embodiment, where there is not a master UAV, one or more of the UAVs can serve as the communication shield, individually or collectively.

The communication shield function operates to protect UAVs within the swarm from unwanted/harmful communications. In one configuration, a UAV is selected to generate electromagnetic signals which cancel, at specific wavelengths, an unwanted signal. In such configurations, the locations of the other UAVs within the swarm can be selected based on those wavelengths, such that at the locations of the UAVs within the swarm, the UAVs do not receive the unwanted signal (and instead receive the cancelled signal.) Moreover, the specific wavelengths can vary based on Doppler principles based on the location of the unwanted signal and the movement of the swarm. Such communication shields can extend beyond all, or a portion of, the UAVs in the swarm.

In another configuration of the communication shield, one or more UAVs are selected to receive all external communications for the entirety of the swarm, process those communications to filter out unwanted/harmful data, then forward communications as necessary to the other UAVs within the swarm. In other words, within this configuration, the communication equipment of the secondary (non-master) UAVs within the swarm are equipped to only respond to the nearfield communications of the master UAV. When an individual UAV leaves the swarm for its delivery, it can enable long-distance communications with precautions in place regarding any known harmful signals, as relayed by the master UAV prior to respective/departing UAV.

Figure 6:
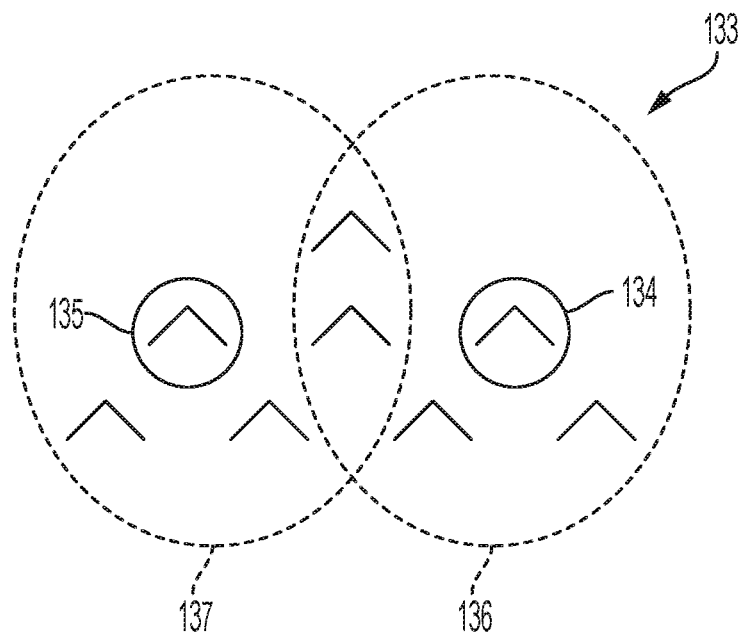
Figure 7:
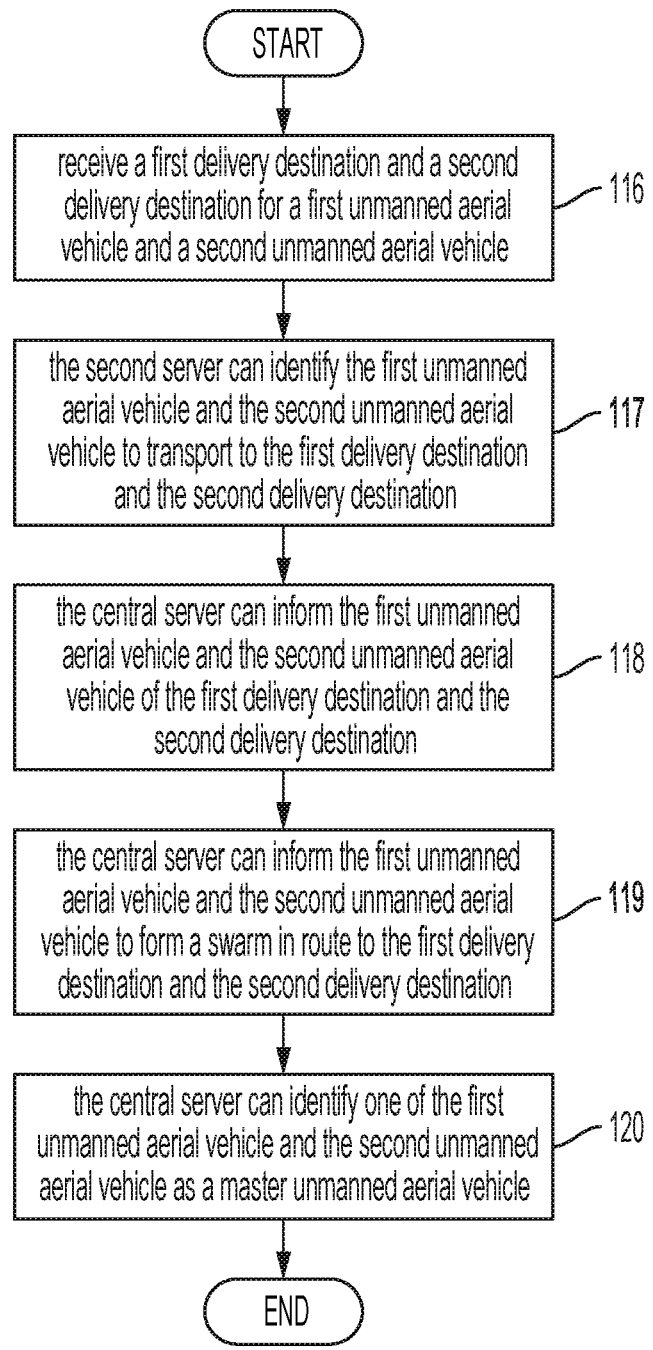
FIG. 7 illustrates an exemplary method for managing a swarm of unmanned aerial vehicles in accordance with embodiments of the invention.

Referring now to FIGS. 6 and 7, communication shields provided to swarms of UAVs is illustrated. FIG. 6 depicts a swarm of UAVs 113 flying together on a particular route. The swarm of UAVs has one UAV 114 providing a communication shield 115 to the entire swarm of UAVs 113. FIG. 7 depicts a swarm of UAVs 135 flying together on a particular route. The swarm of UAVs 135 is can have two UAVs 134, 135 providing a communication shield. The UAV 134 may provide a first communication shield 136. The UAV 135 may provide a second communication shield 137. The first communication shield 136 and the second communication shield 137 may each only encompass a portion of the swarm of UAVs 133. However, the first communication shield 136 and the second communication shield 137 may together encompass the entire swarm of UAVs 133. Although the UAVs 114, 134, 135 serving as the communication shield is located in the middle of the swarm in FIGS. 6 and 7, the UAV(s) serving as the communication shield can be located at any position within the swarm.

Referring back to FIG. 1, whether or not there is a master unmanned aerial drones, all the unmanned aerial drones 102-104 may be able to communication with the central system 101. In addition, all of the unmanned drones may be able to communicate with an emergency authority. This can permit instant awareness if one of the unmanned aerial drones has been compromised.

Figure 8:
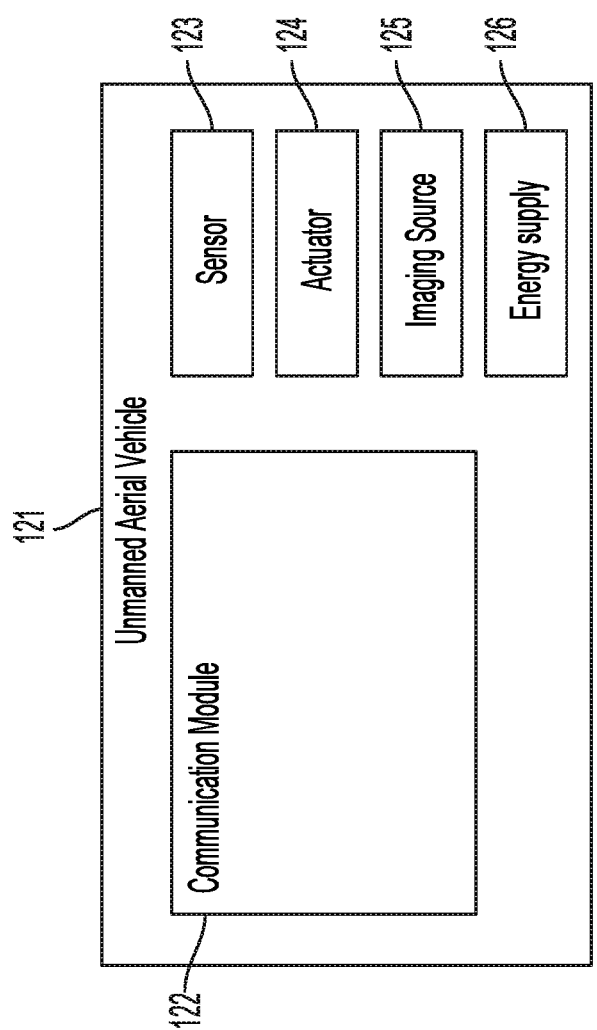
FIG. 8 illustrates an exemplary unmanned aerial vehicle in accordance with embodiments of the invention.

Referring now to FIG. 8, an exemplary method for managing a swarm of UAVs is illustrated. First, at step 116, a central server can receive a first delivery destination and a second delivery destination for a first UAV and a second UAV, respectively. The first delivery destination can be different the second delivery destination. Subsequently, at step 117, the second server can identify the first UAV and the second UAV to transport to the first delivery destination and the second delivery destination, respectively.

Thereafter, at step 118, the central server can inform the first UAV and the second UAV of the first delivery destination and the second delivery destination, respectively. At step 119, the central server can inform the first UAV and the second UAV to form a swarm in route to the first delivery destination and the second delivery destination. Lastly, at step 120, the central server can identify one of the first UAV and the second UAV as a master UAV. The master UAV can be configured to act as a communication shield to block one or more potential threats to the swarm, and to determine if the swarm encounters a risk, in route to the first delivery destination and the second delivery destination.

Figure 9:
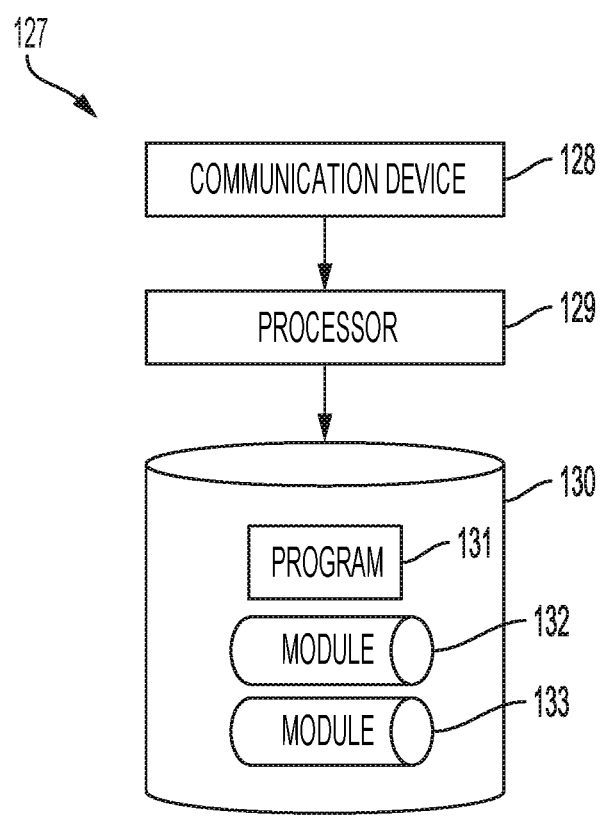
FIG. 9 illustrates an exemplary central server in accordance with embodiments of the present invention.

Referring now to FIG. 9, an exemplary schematic diagram of an UAV 121 in accordance with embodiment of the present invention is illustrated. The UAV 121 can include a communication module 122, one or more sensors 123, one or more actuators 124, an imaging source 125, and an energy supply 126. The communication module 122 can permit the UAV 121 to communicate with another UAV and/or the central server 101 (depicted in FIG. 1). The communication module 122 can be configured to permit the UAV 121 to communicate with another UAV and the central server on different transmission paths. As such, the communication module 122 can be configured to permit the UAV 121 to communicate with another UAV on a transmission path consuming less energy than the transmission path between the UAV 121 and the central server 101 (illustrated in FIG. 1). According to an embodiment, UAVs may communicate with each other via Bluetooth®.

Moreover, the sensors 123 can determine information on the internal and/or external state of the UAV 121. As such, the sensors 123 can determine the position and movement of the UAV 121. In addition, the sensors 123 can determine one or more internal properties of the UAV, as discussed above, including, for example, an amount of energy capable of being provided by the energy supply 126.

Further, as discussed above, the imaging source 125 can be any device capable of providing an image, including, for example, a camera. The imaging source 125 can be capable of providing a route for the UAV 121. As to the energy supply 126, it can be in the form of a battery or gas propelled.

Referring now to FIG. 10, a schematic diagram of an exemplary server 127 that may be utilized in accordance with the present invention is illustrated. The exemplary server 127 includes a communication device 128, a processor 129, and a data storage or memory component 190. The processor 129 is in communication with both the communication device 128 and the memory component 190. The communication device 128 may be configured to communicate information via a communication channel, wired or wireless, to electronically transmit and receive digital data related to the functions discussed herein. The communication device 128 may also be used to communicate, for example, with one or more human readable display devices, such as, an LCD panel, an LED display or other display device or printer. The memory component 130 may include any appropriate information storage device, including combinations of magnetic storage devices (e.g., magnetic tape, radio frequency tags, and hard disk drives), optical storage devices, computer readable media, and/or semiconductor memory devices such as Random Access Memory (RAM) devices and Read-Only Memory (ROM) devices. The memory component 130 may store the program 131 for controlling the processor 129. The processor 129 performs instructions of the program 131, and thereby operates in accordance with the present invention.

The memory component 130 may also store and send all or some of the information sent to the processor 129 in a plurality of modules 131, 132. As such, the module 131, 132 may each contain a look-up table, as discussed above. This can improve the logic and processing speed of the server 127 in analyzing cyber readiness of an organization, as well as reduce the required computing power by the server 127 to do so.

Communication device 128 may include an input device including any mechanism or combination of mechanisms that permit an operator to input information to communication device 128, such as a keyboard, a mouse, a touch sensitive display device, a microphone, a pen-based pointing device, a biometric input device, and/or a voice recognition device. Communication device 128 may include an output device that can include any mechanism or combination of mechanisms that outputs information to the operator, including a display, a printer, a speaker, etc.

The steps outlined herein are exemplary and can be implemented in any combination thereof, including combinations that exclude, add, or modify certain steps.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system for managing communication of a plurality of unmanned aerial vehicles, comprising:
    a central server; and
    a plurality of unmanned aerial vehicles comprised of a master unmanned aerial vehicle and one or more secondary unmanned aerial vehicles,
    wherein the master unmanned aerial vehicle is configured to communicate with the central server and to deliver a first package to a first location,
    wherein a secondary unmanned aerial vehicle in the one or more secondary unmanned aerial vehicles is configured to:
        communicate with at least one of the central server and the master unmanned aerial vehicle; and
        to deliver a second package to a second location;
    wherein the master unmanned aerial vehicle and the secondary unmanned aerial vehicle form a swarm of unmanned aerial vehicles;
    wherein the swarm of unmanned aerial vehicles at least partially share a route for delivery of the first package and the second package to the first location and the second package, respectively; wherein at least one of the plurality of unmanned aerial vehicles is designated as a communication shield to block one or more potential threats to the swarm of unmanned aerial vehicles; and
    wherein the master unmanned aerial vehicle is configured to:
        receive delivery information for the master unmanned aerial vehicle and the secondary unmanned aerial vehicle;
        monitor communication between the swarm of unmanned aerial vehicles; and
        determine if the swarm of unmanned aerial vehicles encounters a risk.

2. The system of claim 1, wherein the secondary unmanned aerial vehicle is configured to select the master unmanned aerial vehicle.

3. The system of claim 1, wherein the central server is configured to select the master unmanned aerial vehicle.

4. The system of claim 1, wherein the master unmanned aerial vehicle is selected based on one or more of:
    a mission of the master unmanned aerial vehicle and the secondary unmanned aerial vehicle;
    capabilities of the master unmanned aerial vehicle and the secondary unmanned aerial vehicle; and
    a route chosen by the central server for the master unmanned aerial vehicle and the secondary unmanned aerial vehicle.

5. The system of claim 1, wherein the central server is configured to determine a best position for master unmanned aerial vehicle in the swarm of unmanned aerial vehicles based on a mission of the swarm of unmanned aerial vehicles.

6. The system of claim 1, wherein the secondary unmanned aerial vehicle is configured to determine a current destination and location of the master unmanned aerial vehicle.

7. The system of claim 6, wherein the secondary unmanned aerial vehicle is configured to break away from the swarm of unmanned aerial vehicles based on the current destination and location of the master unmanned aerial vehicle.

8. The system of claim 1, wherein each of the plurality of unmanned aerial vehicles has a first path of communication and a second path of communication separate from the first path of communication.

9. The system of claim 8, wherein the first path of communication enables each of the plurality of unmanned aerial vehicles to communicate with each other and the second path of communication enables each of the plurality of unmanned aerial vehicles to communicate with the central server.

10. The system of claim 9, wherein the first path of communication consumes lower energy than the second path of communication.

11. The system of claim 1, wherein at least one of the plurality of unmanned aerial vehicles has a sensor configured to identify the risk.

12. The system of claim 11, wherein the secondary unmanned aerial vehicle which has the sensor is configured to communicate an identification of the risk to the master unmanned aerial vehicle.

13. A system for managing communication of a plurality of unmanned aerial vehicles, comprising:
    a central server; and
    a plurality of unmanned aerial vehicles in communication with the central server and configured to deliver a plurality of packages to different locations, wherein the plurality of unmanned aerial vehicles form a swarm of unmanned aerial vehicles that at least partially share a route for delivery of the plurality of packages;

wherein the swarm of unmanned aerial vehicles includes a first unmanned aerial vehicle and a second unmanned aerial vehicle;

wherein the first unmanned aerial vehicle is configured to:
   act as a communication shield to block one or more potential threats to the swarm of unmanned aerial vehicles for a first period of time during the route of the swarm of unmanned aerial vehicles; and
   determine if the swarm of unmanned aerial vehicles encounters a risk during first period of time during the route of the swarm of unmanned aerial vehicles; and wherein the second unmanned aerial vehicle is configured to:
   act as the communication shield for a second period of time during the route of the swarm of unmanned aerial vehicles; and
   determine if the swarm of unmanned aerial vehicles encounters a risk during second period of time during the route of the swarm.

14. The system of claim 13, wherein the communication shield is configured to filter out communication to the plurality of unmanned aerial vehicles in the swarm.

15. The system of claim 14, wherein the communication shield is configured to permit communication between the plurality of unmanned aerial vehicles in the swarm of unmanned aerial vehicles and between each unmanned aerial vehicle and the central server.

16. The system of claim 13, wherein the first unmanned aerial vehicle and the unmanned aerial vehicle are located at different positions in the swarm of unmanned aerial vehicles during the route.

17. The system of claim 13, wherein the first unmanned aerial vehicle and the unmanned aerial vehicle are located at different positions in the swarm of unmanned aerial vehicles during the route for the first period of time and the second period of time, respectively.

18. The system of claim 13, wherein the central server provides each of the plurality of unmanned aerial vehicles with identical functional capabilities within the swarm of unmanned aerial vehicles.

19. A method for managing communication of a plurality of unmanned aerial vehicles, comprising:
   receiving, by a central server, a first delivery destination and a second delivery destination for a first unmanned aerial vehicle and a second unmanned aerial vehicle, respectively, wherein the first delivery destination is different than the second delivery destination;
   identifying, by the central server, the first unmanned aerial vehicle and the second unmanned aerial vehicle to be used in deliveries to the first delivery destination and the second delivery destination, respectively;
   informing, by the central server, the first unmanned aerial vehicle and the second unmanned aerial vehicle of the first delivery destination and the second delivery destination, respectively;
   informing, by the central server, the first unmanned aerial vehicle and the second unmanned aerial vehicle to form a swarm in route to the first delivery destination and the second delivery destination; and
   identifying, by the central server, one of the first unmanned aerial vehicle and the second unmanned aerial vehicle as a master unmanned aerial vehicle,
   wherein the master unmanned aerial vehicle is configured to act as a communication shield to block one or more potential threats to the swarm, and to determine if the swarm encounters a risk, in route to the first delivery destination and the second delivery destination.

* * * * *